United States Patent
Budianu et al.

(10) Patent No.: US 8,639,996 B2
(45) Date of Patent: Jan. 28, 2014

(54) SYSTEMS AND METHODS FOR UPLINK INTER-CELL INTERFERENCE CANCELLATION USING HYBRID AUTOMATIC REPEAT REQUEST (HARQ) RETRANSMISSIONS

(75) Inventors: Petru C. Budianu, San Diego, CA (US); Ravi Palanki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 921 days.

(21) Appl. No.: 12/437,355

(22) Filed: May 7, 2009

(65) Prior Publication Data

US 2010/0011269 A1 Jan. 14, 2010

Related U.S. Application Data

(60) Provisional application No. 61/080,051, filed on Jul. 11, 2008.

(51) Int. Cl.
| | |
|---|---|
| H04L 1/18 | (2006.01) |
| G01R 31/28 | (2006.01) |
| H03M 13/00 | (2006.01) |
| H04B 1/00 | (2006.01) |
| H04B 1/04 | (2006.01) |
| H04B 1/06 | (2006.01) |
| H04B 1/10 | (2006.01) |
| H04N 5/38 | (2006.01) |
| H04M 1/76 | (2006.01) |

(52) U.S. Cl.
USPC ........... 714/748; 714/713; 714/749; 714/821; 375/144; 375/148; 375/E1.02; 455/63.1; 455/114.2; 455/278.1; 455/296; 348/21; 379/416

(58) Field of Classification Search
USPC .......... 714/713, 748, 749, 821; 375/144, 148, 375/E1.02; 455/63.1, 114.2, 278.1, 296; 348/21; 379/416

See application file for complete search history.

(56) References Cited

U.S. PATENT DOCUMENTS

| | | | |
|---|---|---|---|
| 6,167,270 | A | 12/2000 | Rezaiifar et al. |
| 7,190,964 | B2 | 3/2007 | Damnjanovic et al. |

(Continued)

FOREIGN PATENT DOCUMENTS

| | | |
|---|---|---|
| CN | 1424863 A | 6/2003 |
| CN | 1741423 A | 3/2006 |

(Continued)

OTHER PUBLICATIONS

3GPP TR 25.814 V1.2.0, 3rd Generation Partnership Project, Technical Specification Group Radio Access Network, Physical Layer Aspects for Evolved UTRA (Release 7), Internet Citation, Feb. 1, 2006, XP002400401, Retrieved from the Internet: URL: http://www.3gpp.org/ftp/Specs/html - info/25814.htm [retrieved on Sep. 26, 2006].

(Continued)

*Primary Examiner* — John J Tabone, Jr.
(74) *Attorney, Agent, or Firm* — Nerrie M. Zohn

(57) ABSTRACT

Systems, methods, apparatus, devices and computer program products enhance uplink inter-cell interference cancellation with HARQ retransmissions. The decoding of a data packet depends on whether the interfering packet was decoded. Since the interfering packet is itself transmitted using a HARQ process, the transmission by the victim UT can be accomplished to take this situation into account. The latency of the victim UT can be varied based on the need for energy efficient transmission. In accordance with one specific aspect, if the receiver can decode multiple packets simultaneously, high data rates can be achieved using packet pipelining.

50 Claims, 11 Drawing Sheets

(56) References Cited

U.S. PATENT DOCUMENTS

| | | | |
|---|---|---|---|
| 7,218,894 B2 | 5/2007 | Schmidl et al. | |
| 7,248,841 B2 | 7/2007 | Agee et al. | |
| 7,254,158 B2 | 8/2007 | Agrawal | |
| 7,428,269 B2* | 9/2008 | Sampath et al. | 375/267 |
| 7,477,622 B2 | 1/2009 | Attar et al. | |
| 7,548,760 B2* | 6/2009 | Vasudevan et al. | 455/522 |
| 7,822,385 B2 | 10/2010 | Lopez | |
| 7,949,005 B2* | 5/2011 | Li et al. | 370/437 |
| 8,064,837 B2 | 11/2011 | Sampath | |
| 8,160,013 B2 | 4/2012 | Kim et al. | |
| 8,194,598 B2 | 6/2012 | Attar et al. | |
| 8,521,089 B2 | 8/2013 | Lin et al. | |
| 2002/0044614 A1 | 4/2002 | Molnar et al. | |
| 2003/0128679 A1 | 7/2003 | Ishiguro et al. | |
| 2004/0192208 A1* | 9/2004 | Kong et al. | 455/63.1 |
| 2006/0092972 A1 | 5/2006 | Petrovic et al. | |
| 2006/0203794 A1* | 9/2006 | Sampath et al. | 370/344 |
| 2006/0203891 A1* | 9/2006 | Sampath et al. | 375/132 |
| 2007/0010957 A1* | 1/2007 | Sampath et al. | 702/57 |
| 2007/0011550 A1* | 1/2007 | Agrawal et al. | 714/746 |
| 2007/0040704 A1 | 2/2007 | Smee et al. | |
| 2007/0060057 A1 | 3/2007 | Matsuo et al. | |
| 2007/0060061 A1 | 3/2007 | Sampath | |
| 2007/0183451 A1* | 8/2007 | Lohr et al. | 370/473 |
| 2007/0189231 A1 | 8/2007 | Chang et al. | |
| 2007/0248052 A1 | 10/2007 | Nagaraj et al. | |
| 2007/0280175 A1 | 12/2007 | Cheng et al. | |
| 2008/0069074 A1* | 3/2008 | Shin et al. | 370/342 |
| 2008/0170638 A1 | 7/2008 | Schmidl et al. | |
| 2009/0154620 A1 | 6/2009 | Mostafa | |
| 2009/0254790 A1* | 10/2009 | Pi et al. | 714/749 |
| 2009/0264142 A1 | 10/2009 | Sankar et al. | |
| 2009/0286482 A1 | 11/2009 | Gorokhov et al. | |
| 2010/0008294 A1 | 1/2010 | Palanki et al. | |
| 2010/0009634 A1 | 1/2010 | Budianu et al. | |
| 2010/0009705 A1 | 1/2010 | Budianu et al. | |
| 2010/0080323 A1 | 4/2010 | Mueck et al. | |
| 2010/0099449 A1 | 4/2010 | Borran et al. | |
| 2010/0190447 A1 | 7/2010 | Agrawal et al. | |
| 2010/0222063 A1 | 9/2010 | Ishikura et al. | |
| 2010/0235704 A1* | 9/2010 | Gunnarsson et al. | 714/748 |
| 2010/0265862 A1 | 10/2010 | Choi et al. | |
| 2011/0041027 A1* | 2/2011 | Fong et al. | 714/749 |

FOREIGN PATENT DOCUMENTS

| | | |
|---|---|---|
| EP | 1318613 A2 | 6/2003 |
| JP | 6268628 A | 9/1994 |
| JP | 02209253 A | 7/2002 |
| JP | 03174400 A | 6/2003 |
| JP | 2009506652 A | 2/2009 |
| RU | 2233037 | 7/2004 |
| TW | 240364 | 2/1995 |
| TW | 419922 B | 1/2001 |
| TW | I497341 | 8/2002 |
| WO | WO2004036768 | 4/2004 |
| WO | 2007015466 A1 | 2/2007 |
| WO | 2007024962 | 3/2007 |
| WO | WO2007024895 | 3/2007 |
| WO | 2007049998 A1 | 5/2007 |
| WO | WO2007108751 | 9/2007 |
| WO | WO2008036280 | 3/2008 |
| WO | WO2008058112 | 5/2008 |

OTHER PUBLICATIONS

International Search Report and Written Opinion—PCT/US2009/045195, International Search Authority—European Patent Office—Mar. 24, 2011.

Vodafone Group et al., "MDC & Cell Interference control in eHSPA architecture", 3GPP Draft, R3-071611, 3rd Generation Partnership Project (3GPP), Mobile Competence Centre, 650, Route Des Lucioles, F-06921 Sophia-Antipolis Cedex, France, vol. RAN WG3, No. Athens, Greece, Aug. 17, 2007, XP050162420, [retrieved on Aug. 17, 2007].

"3GPP TR 25.814 V1.5.0; 3rd Generation Partnership Project; Technical Specification Group Radio Access Network; Physical Layer Aspects for Evolved UTRA (Release 7)" Internet Citation May 27, 2006, pp. 1-125, XP002574055, sections 7.1.2.6 and 7.1.2.6.2.

International Search Report and Written Opinion—PCT/US2009/045197—International Search Authority, European Patent Office, Jan. 14, 2010.

Qualcomm Europe: "UTRAN enhancements for the support of inter-cell interference cancellation" 3GPP Draft; R3-080069 UTRAN Enhancements for the Support of Inter-Cell Interference Cancellation, 3rd Generation Partnership Project (3GPP), Mobile Competence Centre; 650, Route Des Lucioles; F-06921 Sophia-Antipolis Cedex; France, vol. RAN WG1, No. Shenzhen, China; Mar. 19, 2008, XP050110087.

Ritt et al: "TP on uplink inter-cell interference cancellation" 3GPP Draft; R1-060418, 3rd Generation Partnership Project (3GPP), Mobile Competence Centre; 650, Route Des Lucioles; F-06921 Sophia-Antipolis Cedex; France, vol. RAN WG1, No. Denver, USA; Feb. 9, 2006, XP050101362 [retrieved on Feb. 9, 2006] the whole document.

Taiwan Search Report—TW098117350—TIPO—Sep. 26, 2012.

3GPP TR 25.814 v1.4.0, (May 2006), "3rd Generation Partnership Project; Technical Specification Group Radio Access Network; Physical Layer Aspects for EVolved UTRA (Release 7)", pp. 1-121.

* cited by examiner

SYSTEMS AND METHODS FOR UPLINK INTER-CELL INTERFERENCE CANCELLATION USING HYBRID AUTOMATIC REPEAT REQUEST (HARQ) RETRANSMISSIONS

CLAIM OF PRIORITY UNDER 35 U.S.C. §119

The present Application for Patent claims priority to Provisional Application No. 61/080,051 entitled "Systems and Methods for Uplink Inter-cell Interference Cancellation Using Hybrid Automatic Repeat (HARQ) Retransmissions" filed Jul. 11, 2008, assigned to the assignee hereof and hereby expressly incorporated by reference herein in their entirety.

CROSS REFERENCE TO RELATED APPLICATIONS

The present Application is related to co-pending and commonly assigned U.S. patent application Ser. No. 12/437,334 entitled "Inter-Cell Interference Cancellation Framework" filed on even date herewith, which in turn claims priority to Provisional Application No. 61/080,051, entitled "Systems and Methods for Uplink Inter-cell Interference Cancellation Using Hybrid Automatic Repeat Request (HARQ) Retransmissions," filed Jul. 11, 2008, the disclosures of both of which are hereby expressly incorporated by reference in their entirety.

The present Application is related to co-pending and commonly assigned U.S. patent application Ser. No. 12/437,342 entitled "Inter-Cell Interference Cancellation Framework" filed on even date herewith, which in turn claims priority to Provisional Application No. 61/080,051, entitled "Systems and Methods for Uplink Inter-cell Interference Cancellation Using Hybrid Automatic Repeat Request (HARQ) Retransmissions," filed Jul. 11, 2008, the disclosures of both of which are hereby expressly incorporated by reference in their entirety.

The present Application is related to co-pending and commonly assigned U.S. patent application Ser. No. 12/437,362 entitled "Downlink Interference Cancellation Techniques" filed on even date herewith, which in turn claims priority to Provisional Application No. 61/147,411 filed Jan. 26, 2009 and to Provisional Application No. 61/147,615 filed Jan. 27, 2009, both entitled "Downlink Interference Cancellation Techniques", the disclosures of which are hereby expressly incorporated by reference in their entirety.

BACKGROUND

1. Field

The present application relates generally to wireless communications, and more specifically to methods and systems for enhancing uplink interference cancellation using Hybrid Automatic Repeat reQuest (HARQ) retransmissions.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto cells. Typically, such miniature base stations are connected to the Internet and the mobile operator's network via DSL router or cable modem.

In future revisions of wireless standards such as Long Term Evolution (LTE), there is a need to support base stations of different powers (such as high-powered macro cells and lower-powered pico cells). Additionally, cells such as femto cells operate under "restricted association", i.e., they only allow some user terminals (UTs) (e.g., user equipment, access terminal, mobile device, cellular device, etc.) to connect to them. For example, these UTs may belong to users who subscribe to a special access plan offered by the operator.

In a traditional homogeneous deployment, a UT typically connects to the cell with the highest geometry (i.e., signal to noise ratio). However, in a heterogeneous deployment, there are benefits in allowing the UT to connect to a weaker base station. For example, a UT may connect to the cell with the lowest path loss to minimize interference caused to the network, even though its geometry is lower. Similarly, in the case of restricted association, a UT may be forced to connect to a weaker geometry base station as it may not have permission to access the strongest geometry base station. In such instances in which the UT connects to a cell with lower geometry, the UT will generally experience a significant interference signal transmitted from the stronger base station.

Therefore, there is a need for communication techniques that enable efficient communication to a UT that is subject to a dominant interference signal that is transmitted by a different base-station. The desired systems and method should provide for interference cancellation such that the base station can offset the latency experienced by the UT awaiting decoding of data packets, referred to herein as the "victim" UT, with more efficient bandwidth usage and/or more efficient power consumption.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for hybrid automatic repeat request (HARQ) for enhancing interference cancellation at a receiving node by determining at a first device that a second device requires interference cancellation to successfully receive data packets, transmitting one or more data packets to the second device, waiting to receive acknowledged result of post-cancellation decoding of the transmitted one or more data packets, and HARQ retransmitting the one or more data packets in response to not receiving acknowledgement.

In another aspect, a computer program product is provided for hybrid automatic repeat request (HARQ) for enhancing interference cancellation at a receiving node. A computer-readable storage medium comprises a set of code for causing a computer to determine at a first device that a second device requires interference cancellation to successfully receive data packets. A set of code causes the computer to transmit one or more data packets to the second device. A set of code causes the computer to wait to receive an acknowledged result of the post-cancellation decoding of the transmitted one or more data packets. A set of code causes the computer to HARQ retransmit the one or more data packets in response to not receiving acknowledgement.

In an additional aspect, an apparatus is provided for hybrid automatic repeat request (HARQ) for enhancing interference cancellation at a receiving node. Means are provided for determining at a first device that a second device requires interference cancellation to successfully receive data packets. Means are provided for transmitting one or more data packets to the second device. Means are provided for waiting to receive an acknowledged result of the post-cancellation decoding of the transmitted one or more data packets. Means are provided for HARQ retransmitting the one or more data packets in response to not receiving acknowledgement.

In a further aspect, an apparatus is provided for hybrid automatic repeat request (HARQ) for enhancing interference cancellation at a receiving node. A computing platform determines at a first device that a second device requires interference cancellation to successfully receive data packets. A transmitter transmits one or more data packets to the second device. A receiver waits to receive an acknowledged result of the post-cancellation decoding of the transmitted one or more data packets. The transmitter is further for HARQ retransmitting the one or more data packets in response to not receiving acknowledgement.

In yet one aspect, a method is provided for receiving hybrid automatic repeat request (HARQ) for interference cancellation by receiving a signal containing one or more data packets and interfering data packets, performing cancellation of the interference before decoding the one or more data packets, rescheduling retransmission of the one or more data packets upon decoding failure, and decoding the one or more data packets with the benefit of interference cancellation.

In yet another aspect, a computer program product is provided for receiving hybrid automatic repeat request (HARQ) for interference cancellation. A computer-readable storage medium comprises a set of codes for causing a computer to receive a signal containing one or more data packets and interfering data packets. A set of codes causes the computer to perform cancellation of the interference before decoding the one or more data packets. A set of codes causes the computer to reschedule retransmission of the one or more data packets upon decoding failure. A set of codes causes the computer to decode the one or more data packets with the benefit of interference cancellation.

In yet an additional aspect, an apparatus is provided for receiving hybrid automatic repeat request (HARQ) for interference cancellation. Means are provided for receiving a signal containing one or more data packets and interfering data packets. Means are provided for performing cancellation of the interference before decoding the one or more data packets. Means are provided for rescheduling retransmission of the one or more data packets upon decoding failure. Means are provided for decoding the one or more data packets with the benefit of interference cancellation.

In yet a further aspect, an apparatus for receiving hybrid automatic repeat request (HARQ) for interference cancellation. A receiver receives a signal containing one or more data packets and interfering data packets. A computing platform performs cancellation of the interference before decoding the one or more data packets, reschedules retransmission of the one or more data packets upon decoding failure, and decodes the one or more data packets with the benefit of interference cancellation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Methods, device, apparatus, systems and computer program products are disclosed herein that provide for uplink interference cancellation using HARQ retransmissions. The interference cancellation techniques herein described may be applied to synchronous systems, meaning that the pico cells and femto cells that form the communication system have access to a synchronization source such as the Global Positioning System (GPS) or the like. Additionally, the interference techniques disclosed herein are conducive to instances in which it is difficult to introduce changes in the Physical (PHY) and Medium Access Control (MAC) layers at the existing base stations.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
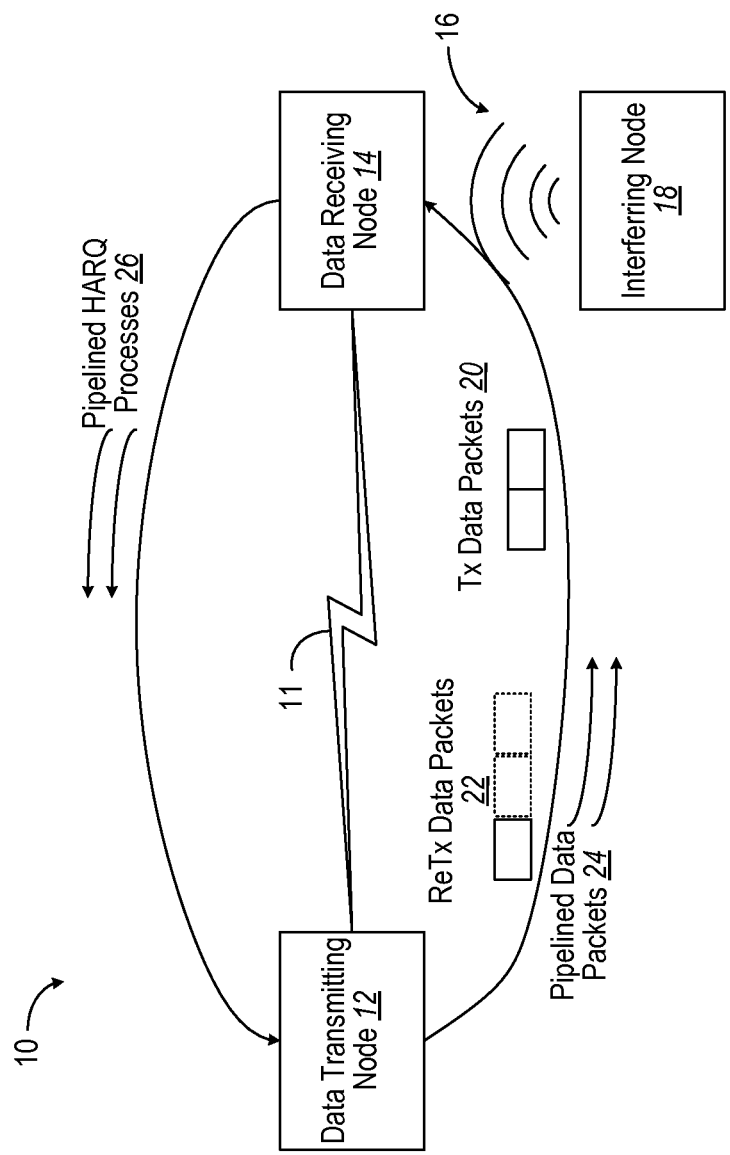
FIG. 1 illustrates a block diagram of a data transmitting device and a data receiving device benefiting from HARQ processes that enhance interference cancellation.

In FIG. 1, a communication network 10 provides for an air link 11 for data transmission/HARQ process between a data transmitting node 12 and a data receiving node 14 that enhances the ability of the data receiving node 14 to perform interference cancellation (C/I) of interference 16 from an interfering node 18. In particular, transmissions of data packets 20 can require appropriate number and timing of retransmitted data packets 22 to facilitate C/I. The number can advantageously be based on minimum latency, minimum retransmission, or a variable (e.g., random) based upon a number likely to be successfully decoded after C/I. Whichever number is selected, in some instances, pipelined data packets 24 from the data transmitting node 12 with corresponding pipelined HARQ processes 26 from the data receiving node 14 can provide further advantages in resource usage.

In an illustrative aspect, the data transmitting node 12 can be a first User Terminal (UT), the data receiving node 14 can be a "victim" UT, and the interfering node 18 can be a jamming UT. The disclosed aspects provide for interference cancellation in the instance in which data packets of the first User Terminal (UT) 12 cannot be decoded by the victim UT 14 unless the packets of the interfering ("jamming") UT 18 are decoded successfully. The interference cancellation techniques described herein provide for scheduling of transmissions on the uplink and the corresponding signaling necessary on the downlink. As detailed infra, by postponing the retransmission requests to allow for the interference cancellation procedure to occur, base stations can trade the latency experienced by the victim UT 14 for more efficient bandwidth usage and/or power consumption.

In one particular aspect, in which the Node B can choose the jamming UT from amongst multiple UTs via scheduling, the scheduling processes herein described serve to minimize the number of HARQ retransmissions and the decoding time of the victim UT.

An efficient bandwidth usage and high data rates can be achieved by the disclosed aspects in instances in which each time a new resource becomes available, the transmitter sends a new data packet. This aspect assumes that the receiver is capable of processing multiple HARQ retransmissions.

Figure 2:
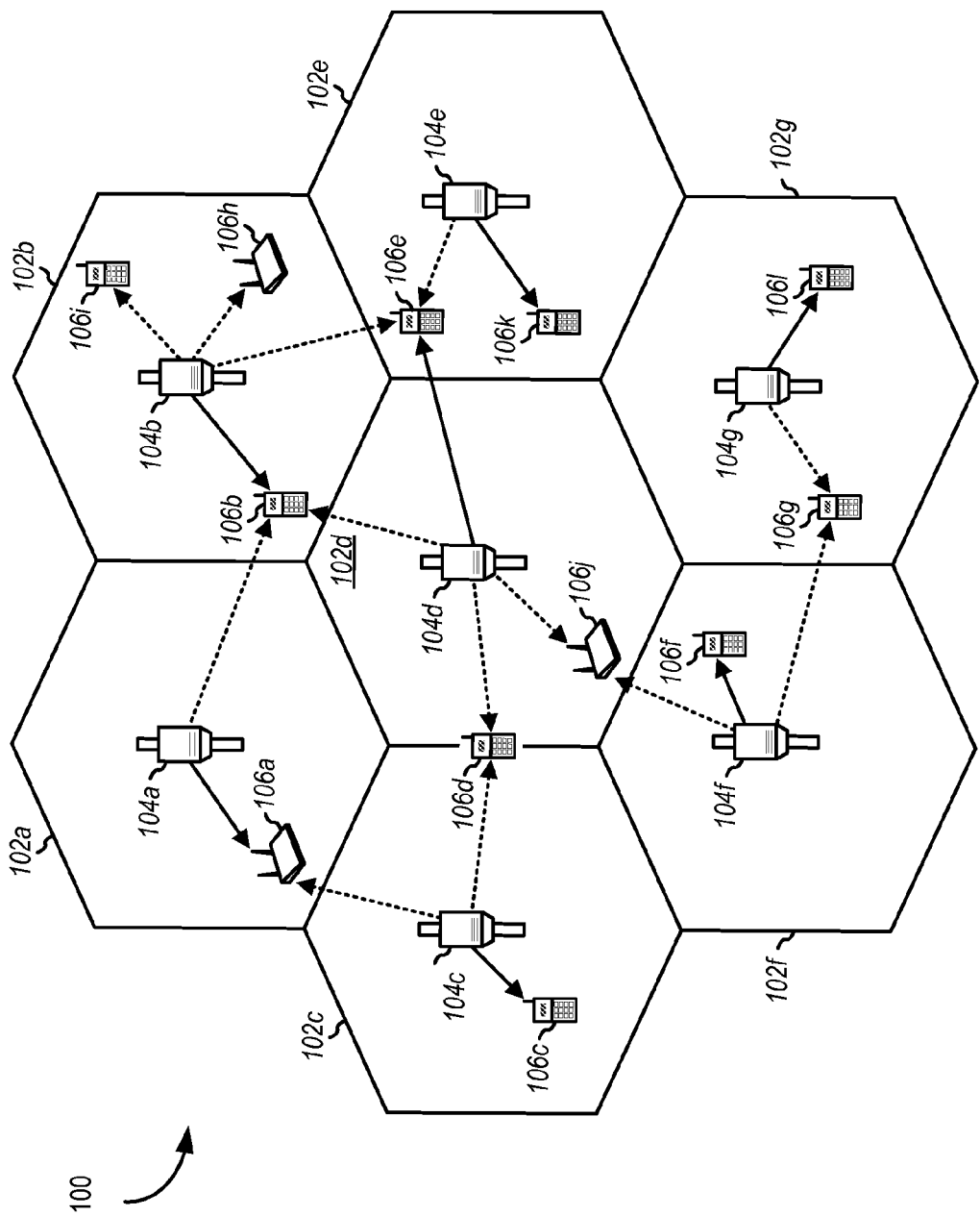
FIG. 2 illustrates an exemplary wireless communication system.

FIG. 2 illustrates an exemplary wireless communication system 100 configured to support a number of users, in which various disclosed embodiments and aspects may be implemented. As shown in FIG. 2, by way of example, system 100 provides communication for multiple cells 102, such as, for example, macro cells 102a-102g, with each cell being serviced by a corresponding access point (AP) 104 (such as APs 104a-104g). Each cell may be further divided into one or more sectors. Various access terminals (ATs) 106, including ATs 106a-106k, also known interchangeably as user equipment (UE) or mobile stations, are dispersed throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region, for example, macro cells 102a-102g may cover a few blocks in a neighborhood.

Figure 3:
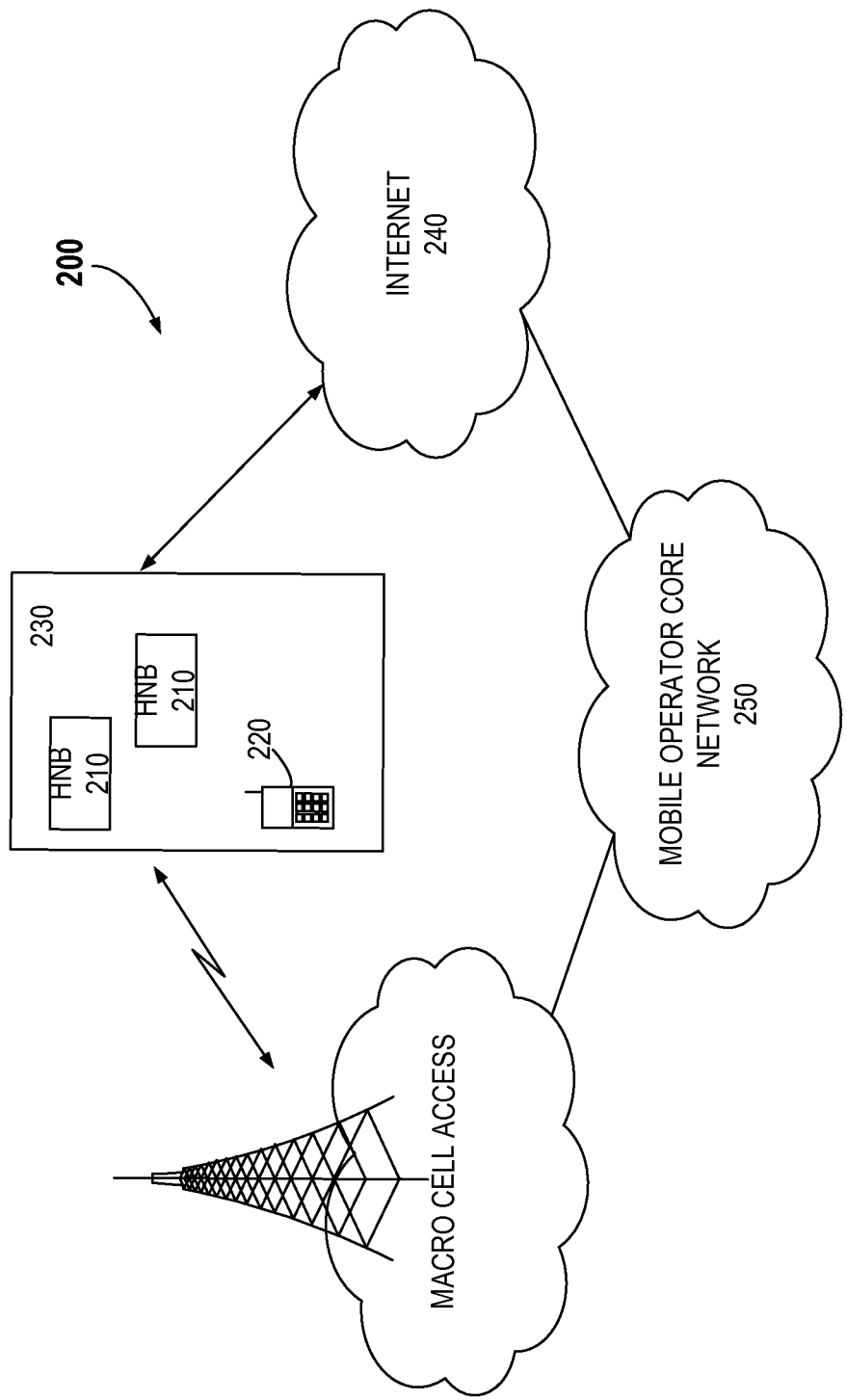
FIG. 3 illustrates an exemplary communication system to enable deployment of access point base stations within a network environment.

FIG. 3 illustrates an exemplary communication system to enable deployment of access point base stations within a network environment. As shown in FIG. 3, the system 200 includes multiple access point base stations or Home Node B units (HNBs) or femto cells, such as, for example, HNBs 210, each being installed in a corresponding small scale network environment, such as, for example, in one or more user residences 230, and being configured to serve associated, as well as alien, user equipment (UE) 220. Each HNB 210 is further coupled to the Internet 240 and a mobile operator core network 250 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1×RTT, 1×EV-DO Rel0, RevA, RevB) technology and other known and related technologies. In such embodiments described herein, the owner of the HNB 210 subscribes to mobile service, such as, for example, 3G mobile service, offered through the mobile operator core network 250, and the UE 220 is capable to operate both in macro cellular environment and in residential small scale network environment. Thus, the HNB 210 is backward compatible with any existing UE 220.

Furthermore, in addition to the macro cell mobile network 250, the UE 220 can only be served by a predetermined number of HNBs 210, namely the HNBs 210 that reside within the user's residence 230, and cannot be in a soft handover state with the macro network 250. The UE 220 can communicate either with the macro network 250 or the HNBs 210, but not both simultaneously. As long as the UE 220 is authorized to communicate with the HNB 210 within the user's residence it is desired that the UE 220 communicate only with the associated HNBs 210.

Figure 4:
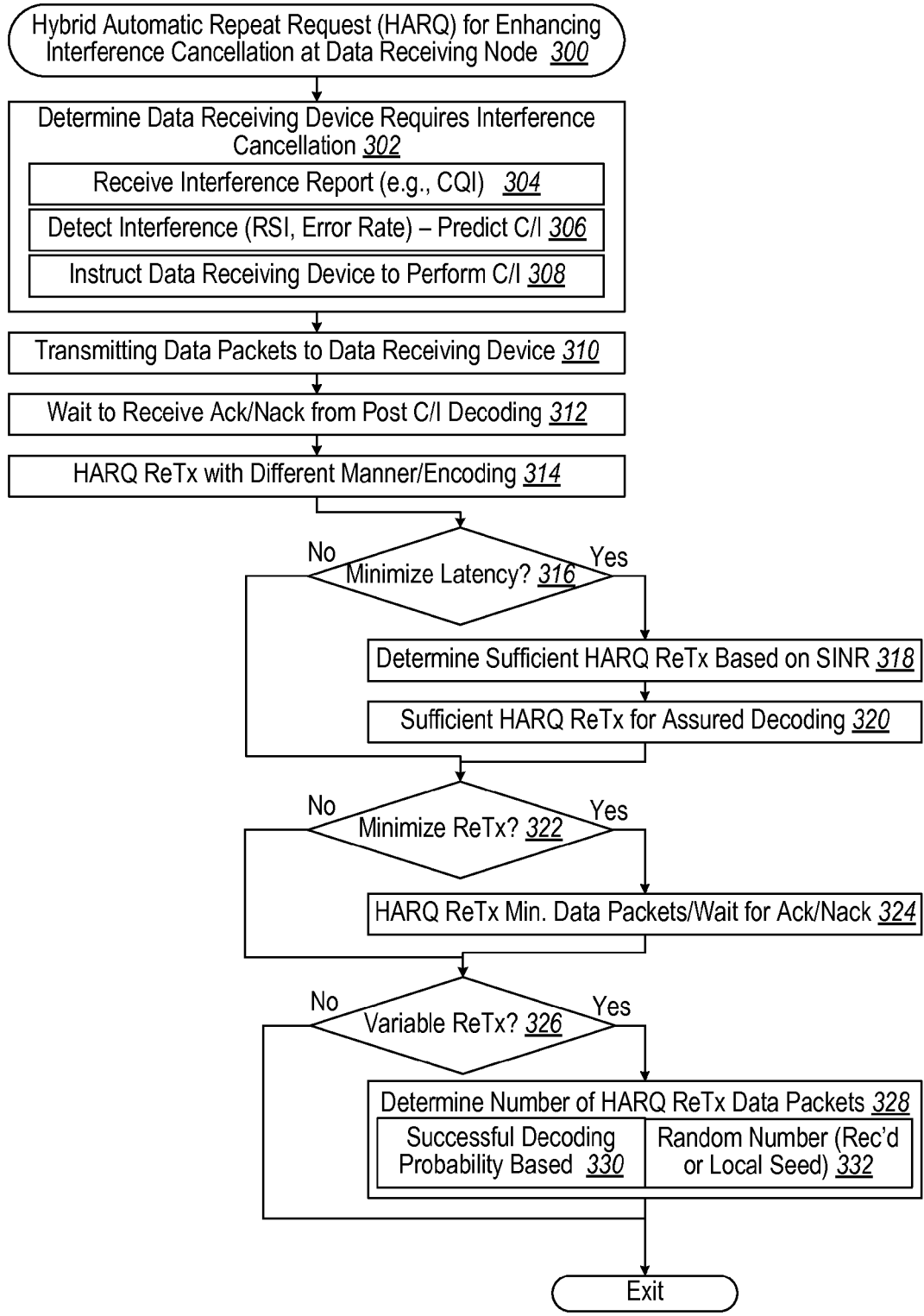
FIG. 4 illustrates a flow diagram of a methodology or sequence of operations for Hybrid Automatic Repeat Request (HARQ) for enhancing interference cancellation at the data receiving node.

In FIG. 4, a methodology or sequence of operations 300 is provided for Hybrid Automatic Repeat-Request (HARQ) for enhancing interference cancellation (C/I). In block 302, a determination is made that a data receiving device (victim UT) requires interference cancellation. This determination can be based upon the data transmitting node receiving an interference report (e.g., channel quality indicator (CQI)) from the data receiving node (block 304). Alternatively, or in addition in block 306, this determination can be based upon directly detecting the source of jamming interference (e.g., received signal power in some of the same resources, increased data error rate indicated by more requests for retransmissions, etc.). This determination can be predictive, or be based upon the data transmitting device instructing the data receiving node to perform C/I (block 308). The data transmitting node transmits one or more data packets to the data receiving node (block 310), waits to receive Ack/Nack (block 312), then performs HARQ retransmission (ReTx) as required in a different manner/encoding in order to successfully overcome the interference (block 314).

In one aspect, it is advantageous to determine that a minimized latency for successful transmission and decoding is desired (block 316). If so, in some implementations a determination is made as to a sufficient number of HARQ retransmissions that should be sent to be successful based upon the Signal to Interference plus Noise Ratio (SINR) (block 318). In any event, sufficient numbers of HARQ retransmissions are sent for successful decoding with minimized latency (block 320).

Alternatively or in addition, a determination is made that minimized retransmissions is appropriate rather than rather than minimized latency (block 322). If so, a minimum number (e.g., one) of HARQ retransmission is performed and then a wait is performed to see if successfully received (block 324).

Alternatively or in addition, a determination is made that variable number of HARQ retransmission is appropriate to balance latency and retransmissions (block 326). If so, a determination is made as the appropriate number of HARQ retransmission packets to send (block 328). For example, a computation can be made as a probability that a certain number will result in a successful decoding (block 330). For example, an expectation can be computed for how long it would take for the victim UT to perform interference cancellation followed by the likelihood of then being able to decode the data packets. Alternatively, the number of HARQ retransmitted can be randomly determined, such as using a seed value that is received or from a local process (block 332).

According to present aspects, methods, apparatus, systems, devices and computer program products are disclosed for uplink interference cancellation for HARQ retransmissions. For the purposes of the aspects herein disclosed one slot represents one transmission opportunity. For example, in LTE, each data packet is retransmitted every eight (8) interlaces; the interlacing structure be fixed. Thus, successive transmissions, as represented in FIGS. 5-8 and 10 are spaced 8 milliseconds (ms) apart in LTE.

In accordance with aspects in which interference cancellation is provided to two UTs; the system includes a victim terminal, a jamming terminal, and two base stations, referred to as enhanced Node B "A" (eNB_A) and enhanced Node B "B" (eNB_B). eNB_A communicates with victim UT, while eNB_B communicates with jamming UT. The signal transmitted by jamming UT acts as interference at eNB_A. Moreover, a strong form of interference cancellation is performed by eNB_A. This means that the packets transmitted by the victim UT cannot be decoded unless the packets of the jamming UT are decoded correctly first, in this case by eNB_B.

If HARQ retransmissions are used by both the jamming UT and the victim UT, then each data packet of both the jamming UT and the victim UT is part of a HARQ retransmission sequence. For simplicity, consider that the jamming UT has its transmissions scheduled without any gap, meaning that after each HARQ sequence, a new one starts in the first slot available. Conversely, eNB_A can ask the victim UT to hold its transmissions for predetermined period and retransmit only when requested.

Figure 5:
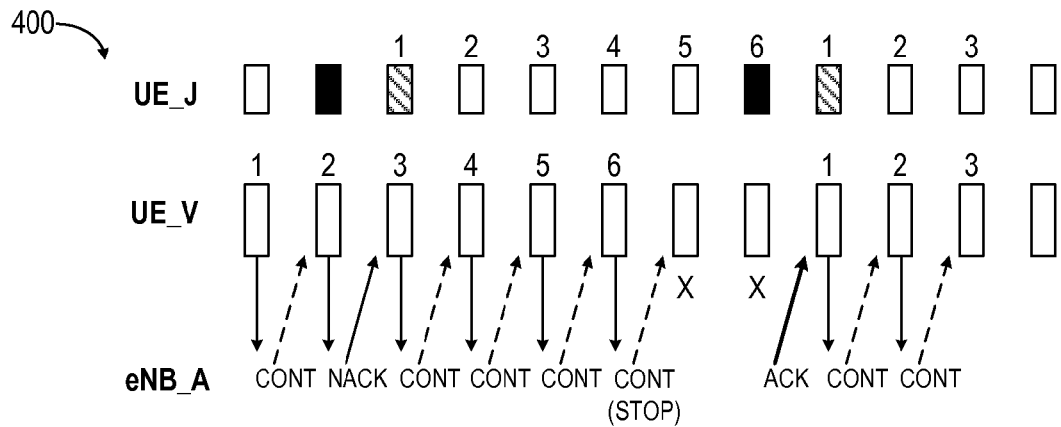
FIG. 5 illustrates an uplink transmission and downlink signaling diagram illustrating an interference cancellation aspect that minimizes latency according to aspect.
Figure 6:
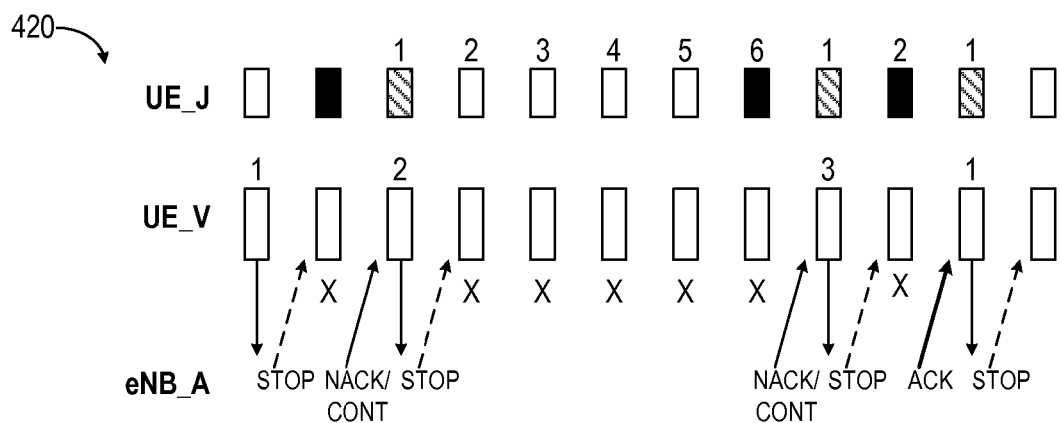
FIG. 6 illustrates an uplink transmission and downlink signaling diagram illustrating an interference cancellation aspect that minimizes the number of retransmissions, according to aspect.

FIGS. 5 and 6 provide respectively at 400 and 420 an uplink transmission and downlink signaling diagram illustrating interference cancellation with two UTs and continuous transmissions. In the presence of interference, the victim UT cannot decode packets unless packets associated with the jamming UT are decoded. After eNB_A receives a predetermined number of transmissions, referred to herein as the kth transmission of a data packet sent from the victim UT, eNB_A can decode the packet only if eNB_B has decoded the transmission from the jamming UT in the same slot.

FIG. 5 provides an alternate aspect for uplink interference cancellation using HARQ retransmissions that serves to minimize latency, according to an aspect. The victim retransmits the packet, without knowing if, post-cancellation, the decoding would have been feasible with fewer retransmissions of the current packet. This type of interference cancellation scheme minimizes the packet decoding time at the expense of power consumption. In FIG. 5, the victim transmits two copies of the data packet; eNB_A attempts to decode the packet but fails because eNB-B has not decoded the transmission from the jamming UT in the same slot. Based on the failure to decode, eNB_A sends a negative acknowledgement (NACK) signal to the victim UT, which, in turn, responds by transmitting a predetermined number of copies—in this example, four additional copies—and subsequently waits for the acknowledgement indicating successful decoding. As illustrated during the second round of transmissions in which four copies were transmitted, more copies were transmitted than were needed as the data packet could have been decoded after the third overall transmission (i.e., the first transmission in the second round of transmissions).

FIG. 6 at 420 provides an alternate aspect for uplink interference cancellation using HARQ retransmissions that serves to minimize the number of retransmissions, according to an aspect. In general, most of the data packet formats are not designed to be decoded after the first transmission. Thus, assume that $k_0$ defines the minimum number of transmissions after which a data packet can be decoded for a given packet format. Based on this assumption, the victim UT may transmit $k_0$ copies of the data packet and then wait for the packet of the jamming UT to be decoded by eNB_B. Then, eNB_A performs interference cancellation on the existing $k_0$ copies and informs the victim UT of the result. If the decoding is not successful, the victim transmits one more copy of the data packet and waits for the result of the post-cancellation decoding. In this instance, because each time that one more copy of the packet is transmitted, eNB_A waits for the packet of the jamming UT to be decoded, increased latency is introduced in the process. As shown in FIG. 6, after $k_0$ copies of the data packet have been transmitted and the decoding is deemed unsuccessful, the victim UT transits one copy of the data packet and then waits for an acknowledgement or a negative acknowledgement signifying the packet of the jamming UT has or has not been decoded.

FIGS. 5 and 6 provide for alternate aspects for uplink interference cancellation using HARQ retransmissions that provide for flexibility in the HARQ transmissions. In a flexible HARQ transmission scheme, the victim UT transmits the copies of the data packet in two stages. First, the victim UT transmits a predetermined number of copies defined as $k_1$. In some aspects, $k_1$ is greater than the number defined by $k_0$. After the $k_1$ number of copies are transmitted, the victim UT waits for the result of the post-cancellation decoding of the data packets. If unsuccessful, the victim transmits one or more additional copies of the data packet. In the example shown in FIG. 7 at 440, the victim UT is configured to transmit two copies of the packet initially and then waits for an acknowledgement. If the acknowledgement is a negative acknowledgement, the victim UT transmits one copy of the data packet per transmission. In this example, if the probability of correct decoding after the first transmission is low, the increase of the average number of retransmissions is minimal while the latency that is observed is decreased.

Figure 7:
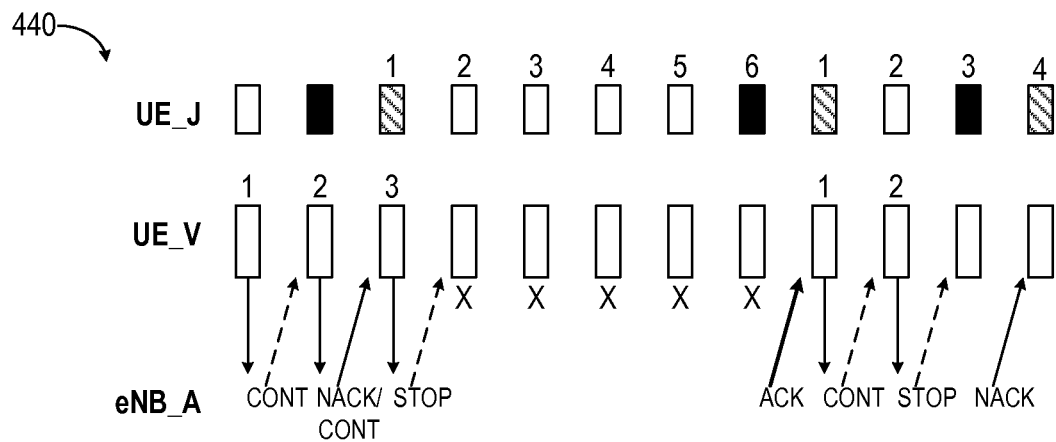
FIG. 7 illustrates an uplink transmission and downlink signaling diagram illustrating a hybrid interference cancellation aspect, according to aspect.
Figure 8:
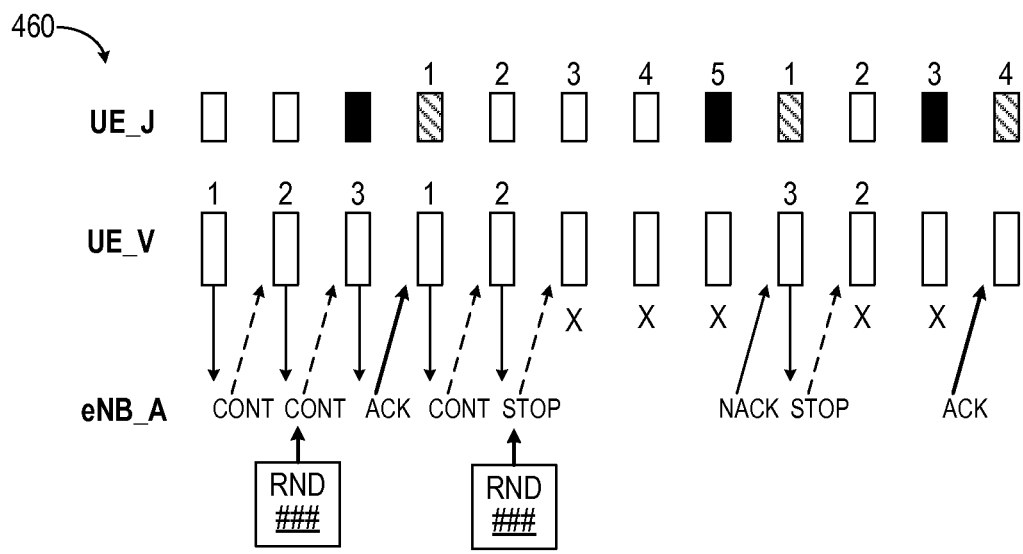
FIG. 8 illustrates a timing diagram for pipelining data packets with corresponding multiple HARQ processes.

A variant of the interference cancellation method described in FIG. 7 is shown in FIG. 8 at 460. In the aspect shown in FIG. 8, the number of packet retransmissions is randomly chosen at each step. In this regard, the average number of retransmissions can be adjusted accordingly, assuming that all other parameters of the system remain constant. As shown, an initial random number of three (3) is chosen and three copies of the data packet are transmitted without waiting for an acknowledgement. In the next instance, a random number of two (2) is chosen and two copies of the data packet are transmitted. In the last instance, a random number of one (1) is chosen and one copy of the data packet is transmitted.

In a flexible scheme in which the victim UT transmits a random number of data packet copies each time, in one aspect, the random number can be generated at eNB_A. In an alternate aspect, the random number may be generated by the HARQ process of the jamming UT. In this aspect, the distribution of the number of packet transmissions by victim UT remains the same, but the distribution of the decoding times can be adjusted. However, it should be noted that the average decoding time cannot be altered through this procedure. The following provides an example of the random number being generated by the HARQ process.

Assume that the data packets associated with the victim UT can be decoded, post-cancellation, by eNB_A with a probability 0.5 for the first transmission and a probability of 1.0 for the second transmission. Additionally, assume that jamming IT has set the target number of retransmissions to an appropriately large enough level. If the latency minimizing scheme is used (FIG. 5), the average number of retransmissions would be almost two (2); noting that there are instances in which the first transmission of the victim UT overlaps with the last HARQ transmission of the jamming UT and, thus, the post-cancellation can occur instantaneously. If the energy minimizing technique (FIG. 6) is implemented, the average number of retransmissions would be 1.5.

Implementing a flexible scheme in which the victim UT retransmits the packet right away with a probability of 0.5, the average number of retransmissions would be 1.75. In the flexible scheme, the average latency does not depend on the manner in which the retransmission decision is made, but rather it depends on the distribution of the retransmissions. For an application in which the maximum decoding time is paramount, the victim UT can choose to retransmit the packet immediately if the first and second transmissions occur sometime at the beginning of the HARQ sequence of the jamming UT.

In other aspects, multiple jamming UTs communicate with eNB_B, and eNB_A can schedule the victim UT such that it collides with a specific jamming UT at a specific point in time.

In one aspect, a scheduling scheme that minimizes the latency but does not use extra retransmissions is defined. This scheme is an optimized version of the scheme depicted in FIG. 6. Assume that eNB_A stores a list of probabilities $P_k$, where $P_k$ is the probability the data packet of jamming $UT_k$ is decoded at the next retransmission. Then, eNB_A schedules the victim UT such that at the next retransmission the transmission collides with jamming $UT_{k\_MAX}$, where k_MAX is equal to argmax $\{P_k\}$. Subsequently, eNB_A waits for the packet of jamming $UT_k$ to be decoded, performs interference cancellation and then repeats the process for the next retransmission.

In other aspects, the same scheme can be applied if the victim UT is capable of transmitting more than one copy of the data packet without waiting for the post-cancellation decoding result; the number of transmissions denoted as m. In this aspect, $P_k$ is the probability that the packet of jamming $UT_k$ is decoded after m transmissions from the current point in time.

The transmission strategy of a single packet tailored to minimize the number of retransmissions results not only in increased latency but also in decreased data rates. The latter problem can be addressed by having multiple HARQ processes, i.e., multiple packets, transmitted simultaneously. In this manner, the achievable data rates on the uplink are the same as in the standard single HARQ process without interference cancellation. The maximum number of HARQ processes that a transmit-receiver (Tx-Rx) pair is capable of supporting may be equal to the maximum number of HARQ retransmissions by the jamming UTs. However, in general, the distribution of the number of retransmissions provides for $P[N_{HARQ\_} > N_{EFF}] < p_E$, where $p_E$ can be minimal. For example, in all packet formats if $N_{HARQ\_MAX} = 6$, then $P[N_{HARQ\_} > 4] < 0.1$, which means that it is acceptable for the system to support 4 HARQ processes simultaneously.

Figure 9:
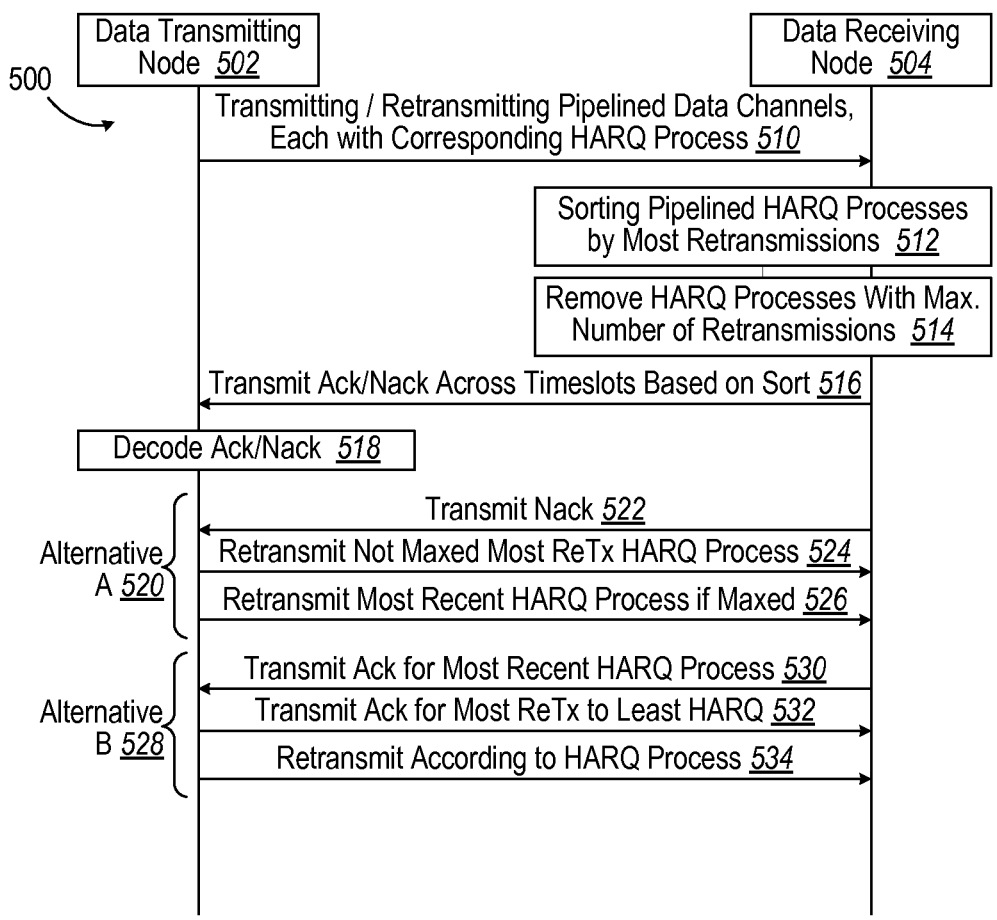
FIG. 9 illustrates an uplink transmission and downlink signaling diagram illustrating a flexible hybrid interference cancellation aspect that minimizes latency according to aspect.

In FIG. 9, a methodology or sequence of operations 500 are depicted for a data transmitting node 502 performing piped data and HARQ processes with a data receiving node 504. As depicted at 510, the data transmitting node 502 transmits and retransmits in a pipelined data channel, each with a corresponding HARQ process. The data receiving node 504 sorts the pipelined HARQ processes by those having the most retransmissions (block 512). Those HARQ processes having reached the maximum number of retransmissions are removed (block 514). Depending on when/if the data packets are successfully received, the data receiving node 504 uses success time slots to transmit Ack/Nack based upon the sort results (block 516), which are decoded in turn by the data transmitting node 502 (block 518). In an Alternative "A" depicted at 520, the data receiving node 504 transmits a Nack as depicted at 522. The data transmitting node 502 responds by retransmitting first the most retransmitted data packets associated with the Nack'ed HARQ process that has not yet reached a maximum number of retransmissions as depicted at 524. Thereafter, the data transmitting node 502 retransmits the most recent data packets that are the least likely to have been successfully decoded 526. In another Alternative "B" depicted at 528, the data receiving node 504 transmits Ack for the most recent HARQ process as depicted at 530. The data transmitting node 502 responds at 532 by transmitting Ack for the most recent HARQ process and then transmitting Ack for most retransmitted to least retransmitted HARQ Process. As depicted at 534, the data transmitting node 502 retransmits according to the decoded pipelined HARQ acknowledgements.

Figure 10:
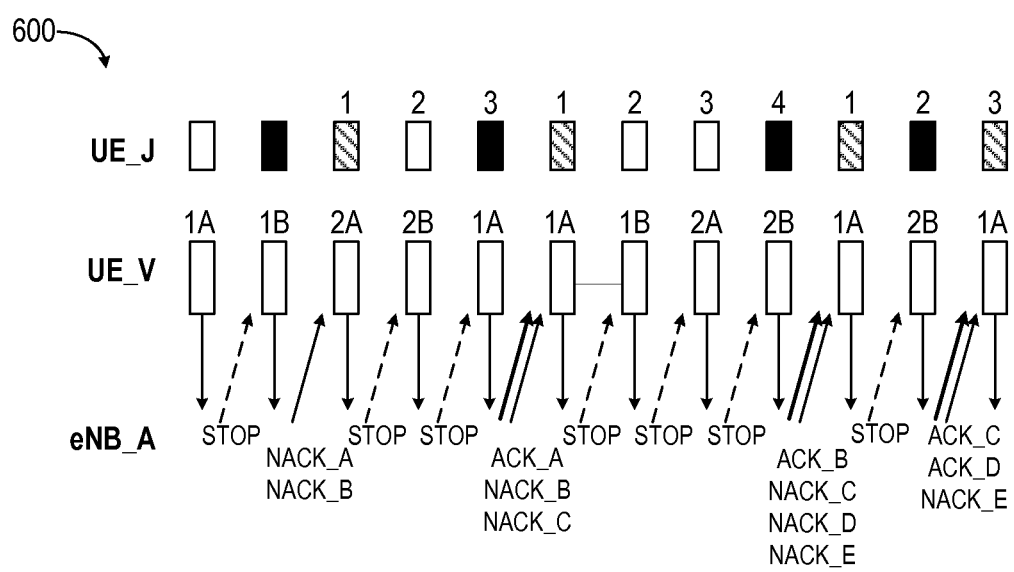
FIG. 10 illustrates an uplink transmission and downlink signaling diagram illustrating packet pipelining, according to a further aspect.

FIG. 10 at 600 provides an example of uplink inter-cell interference cancellation for HARQ retransmissions using packet pipelining, according to an aspect of the innovation. In the illustrated aspect, a maximum of four HARQ processes may occur simultaneously. In the packet pipelining scenario, eNB_A sends more than one acknowledgement at a time. These acknowledgements may be distributed across successive timeslots, since STOP and NACK messages can be made implicit. In one aspect, eNB_A sorts the HARQ processes after x number of retransmissions have occurred, in decreasing order and identifies the HARQ processes as h1, h2 . . . hx. In this aspect, h1 is the HARQ process with the greatest number of retransmissions.

In one aspect, eNB_A transmits only one ACK message at a time, and identifies to which HARQ process the ACK message corresponds, or one NACK. After attempting to decode the existing packets, eNB_A transmits the ACK or NACK corresponding to h1. This ACK is interpreted by the UT as the start of a new decoding cycle. If eNB_A transmits NACK, then UT shall retransmit the packet corresponding to h1 (if the maximum number of retransmissions has not been reached). Otherwise, the UT shall retransmit the packet corresponding to hx, the last packet in the queue. The packet hx is retransmitted because this is the least likely packet to have been decoded. Next, eNB transmits the ACK corresponding to the next HARQ process on the list. For example, if h2 was not decoded successfully but h3 was, then eNB_A shall transmit the ACK for h3. UT will determine that h2 was not decoded correctly and transmit h2 at the first opportunity.

In an alternate aspect, eNB_A transmits first the ACK or NACK of hx, and if it is an ACK, then the UT passes over the transmission in the corresponding slot. Then, eNB_A starts transmitting ACKs starting with h1. In this regard, the energy inefficiency has been decreased at the expense of the latency.

TABLE 1 provides for examples of additional downlink control messages and the scenarios in which the messages may be sent during the uplink interference cancellation process, according to present aspects.

TABLE 1

| Message | Scenario when Transmitted | Necessary |
| --- | --- | --- |
| CONT/STOP | Energy-efficient scenario, with random number of back-to-back transmissions | YES |
| CONT/STOP | Energy-efficient scenario, with fixed number of back-to-back transmissions | NO; it can be made implicit and NACK can be sent only when decoding is performed. |
| ACK # | Pipelined packets and acknowledgements | YES |
| ACK # | Pipelined packets, simultaneous acknowledgements | NO; the number can be determined from the list of ACKS, if both ACKS and NACKS are transmitted. |

Thus, present aspects provide for decoding of a data packet depending on whether the interfering packet was decoded. Since the interfering packet is itself transmitted using a HARQ process, the transmission by the victim UT can be accomplished to take this situation into account. The latency of the victim UT can be varied based on the need for energy efficient transmission. In accordance with one specific aspect, if the receiver can decode multiple packets simultaneously, high data rates can be achieved using packet pipelining.

Figure 11:
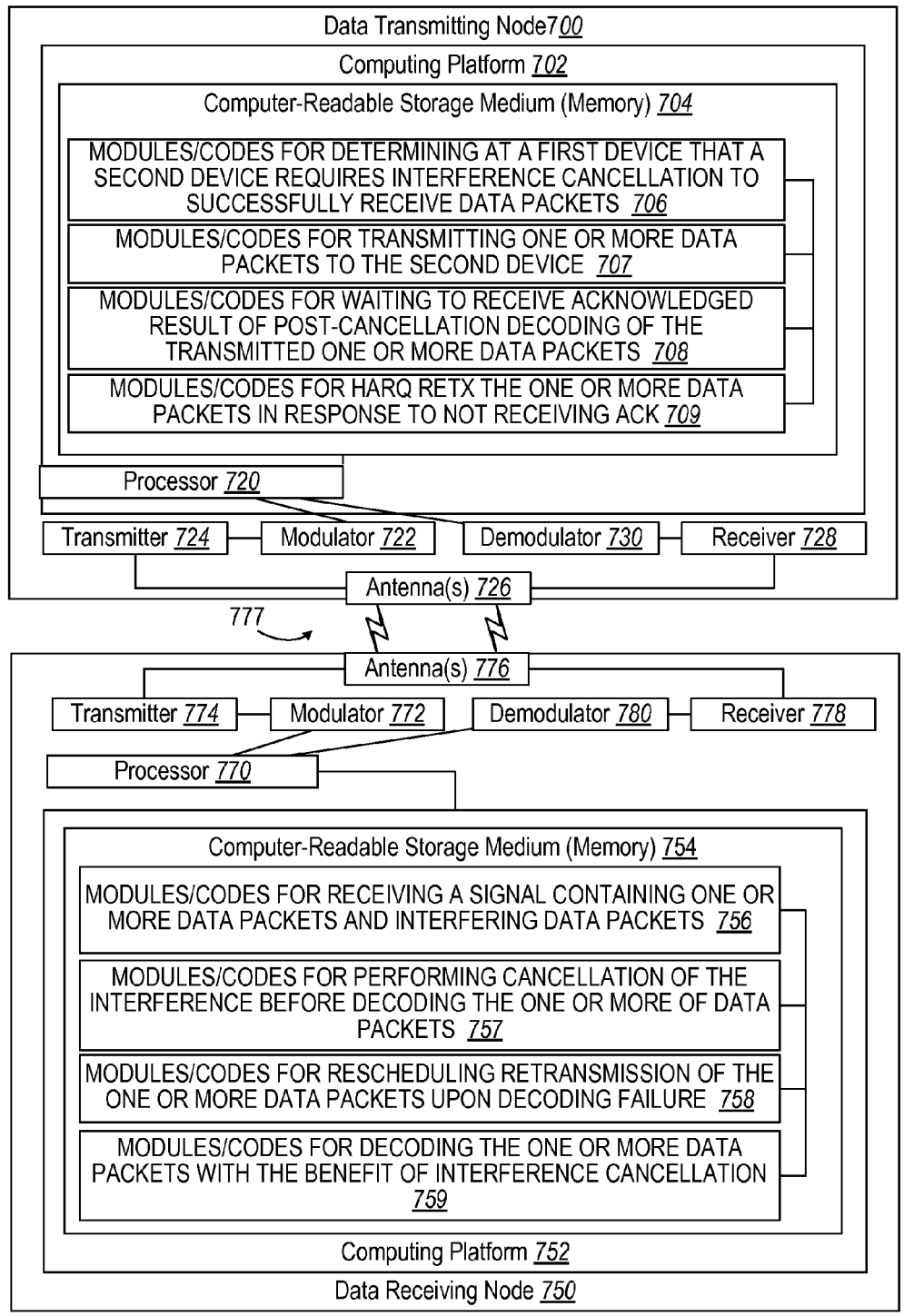
FIG. 11 illustrates a block diagram of a data transmitting node and data receiving node each having a computing platform for performing methods for performing wireless interference cancellation with enhanced HARQ.

In FIG. 11, a serving radio access network (RAN), depicted as an evolved base node (eNB) 700, has a computing platform 702 that provides means such as sets of codes for causing a computer to hybrid automatic repeat request (HARQ) for enhancing interference cancellation at a receiving node. In particular, the computing platform 702 includes a computer readable storage medium (e.g., memory) 704 that stores a plurality of modules 706-709 executed by a processor(s) 720. A modulator 722 controlled by the processor 720 prepares a downlink signal for modulation by a transmitter 724, radiated by antenna(s) 726. A receiver 726 receives uplink signals from the antenna(s) 726 that are demodulated by a demodulator 730 and provided to the processor 720 for decoding. In particular, means (e.g., module, set of codes) 706 are provided for determining at a first device that a second device requires interference cancellation to successfully receive data packets. Means (e.g., module, set of codes) 707 are provided for transmitting one or more data packets to the second device. Means (e.g., module, set of codes) 708 are provided for waiting to receive acknowledged result of post-cancellation decoding of the transmitted one or more data packets. Means (e.g., module, set of codes) 709 are provided for HARQ retransmitting the one or more data packets in response to not receiving acknowledgement.

With continued reference to FIG. 11, a mobile station, depicted as user equipment (UE) 750, has a computing platform 752 that provides means such as sets of codes for receiving hybrid automatic repeat request (HARQ) for interference cancellation. In particular, the computing platform 752 includes a computer readable storage medium (e.g., memory) 754 that stores a plurality of modules 756-759 executed by a processor(s) 770. A modulator 772 controlled by the processor 770 prepares an uplink signal for modulation by a transmitter 774, radiated by antenna(s) 776 as depicted at 777 to the eNB 700. A receiver 778 receives downlink signals from the eNB 700 from the antenna(s) 776 that are demodulated by a demodulator 780 and provided to the processor 770 for decoding. In particular, means (e.g., module, set of codes) 756 are provided for receiving a signal containing one or more data packets and interfering data packets. Means (e.g., module, set of codes) 757 are provided for performing cancellation of the interference before decoding the one or more of data packets. Means (e.g., module, set of codes) 758 are provided for rescheduling retransmission of the one or more data packets upon decoding failure. Means (e.g., module, set of codes) 759 are provided for decoding the one or more data packets with the benefit of interference cancellation.

Figure 12:
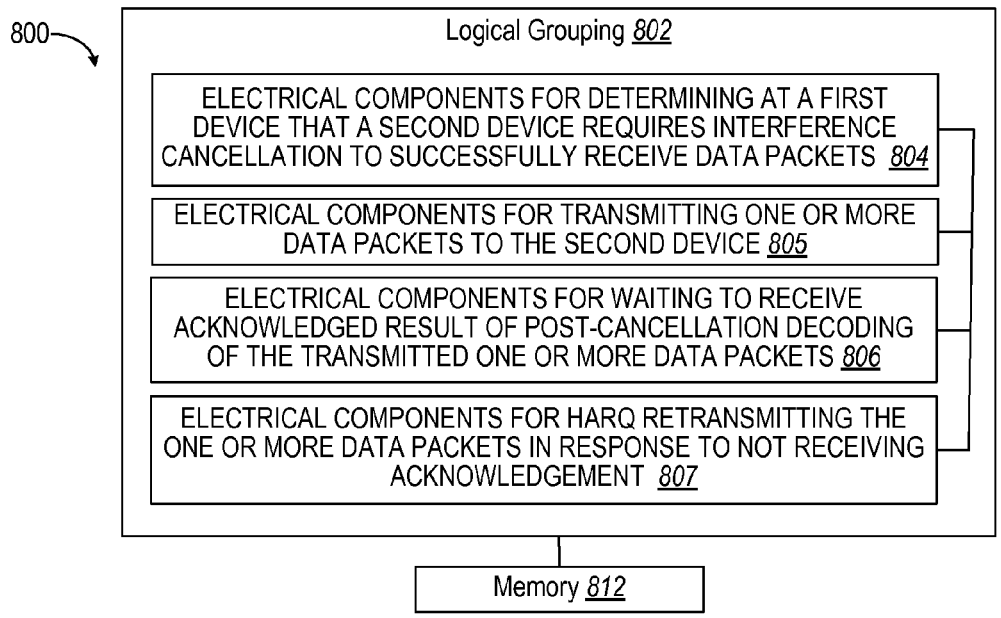
FIG. 12 illustrates a block diagram of a system having a logical grouping of electrical components for performing wireless interference cancellation.

With reference to FIG. 12, illustrated is a system 800 for hybrid automatic repeat request (HARQ) for enhancing interference cancellation at a receiving node. For example, system 800 can reside at least partially within user equipment (UE). It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for determining at a first device that a second device requires interference cancellation to successfully receive data packets 804. Moreover, logical grouping 802 can include an electrical component for transmitting one or more data packets to the second device 805. Further, logical grouping 802 can include an electrical component for waiting to receive acknowledged result of post-cancellation decoding of the transmitted one or more data packets 806. In addition, logical grouping 802 can include an electrical component for HARQ retransmitting the one or more data packets in response to not receiving acknowledgement 807. Additionally, system 800 can include a memory 812 that retains instructions for executing functions associated with electrical components 804-807. While shown as being external to memory 812, it is to be understood that one or more of electrical components 804-807 can exist within memory 812.

Figure 13:
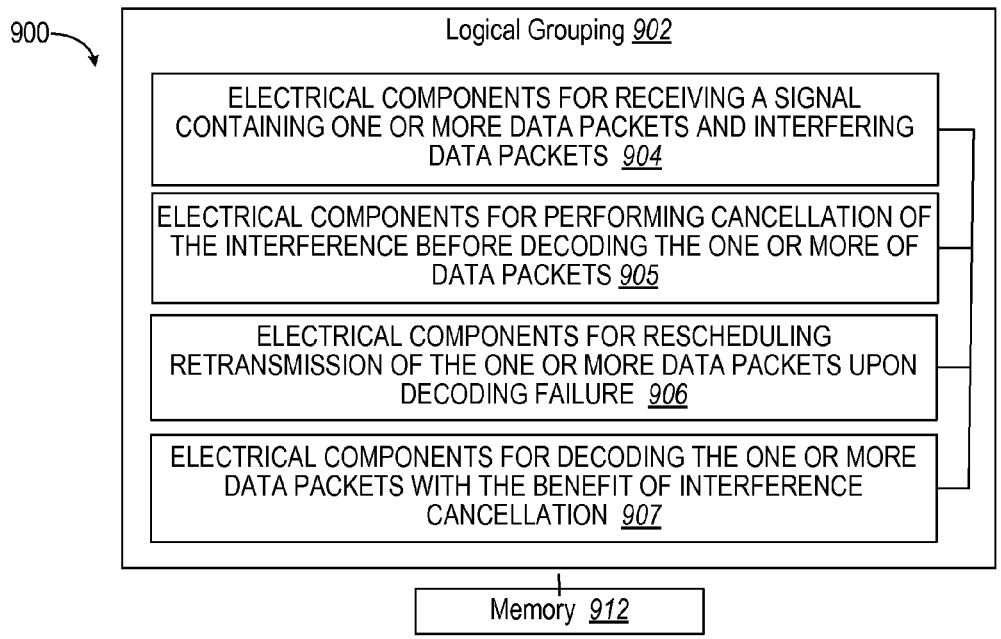
FIG. 13 illustrates a block diagram of a system having a logical grouping of electrical components for enhancing performance of wireless interference cancellation.

With reference to FIG. 13, illustrated is a system 900 that enables a wireless device to receive hybrid automatic repeat request (HARQ) for interference cancellation. For example, system 900 can reside at least partially within a base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a signal containing one or more data packets and interfering data packets 904. In addition, logical grouping 902 can include an electrical component for performing cancellation of the interference before decoding the one or more of data packets 905. Further, logical grouping 902 can include an electrical component for rescheduling retransmission of the one or more data packets upon decoding failure 906. Further, logical grouping 902 can include an electrical component for decoding the one or more data packets with the benefit of interference cancellation 907. Additionally, system 900 can include a memory 912 that retains instructions for executing functions associated with electrical components 904-907. While shown as being external to memory 912, it is to be understood that one or more of electrical components 904-907 can exist within memory 912.

Figure 14:
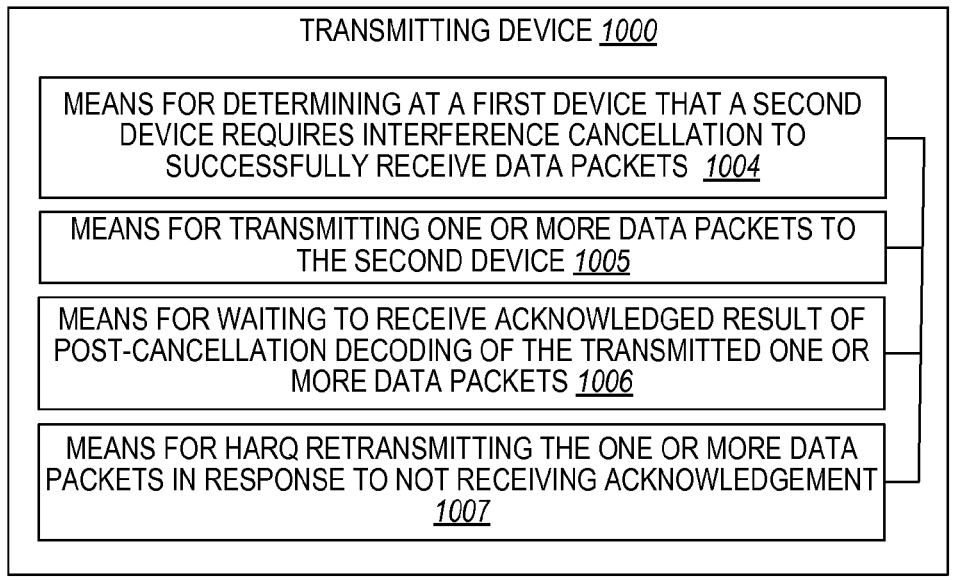
FIG. 14 illustrates an apparatus having means for enhancing interference cancellation at a receiving node.

In FIG. 14, a transmitting apparatus 1000 is provided for hybrid automatic repeat request (HARQ) for enhancing interference cancellation at a receiving node. Means 1004 are provided for determining at a first device that a second device requires interference cancellation to successfully receive data packets. Means 1005 are provided for transmitting one or more data packets to the second device. Means 1006 are provided for waiting to receive acknowledged result of post-cancellation decoding of the transmitted one or more data packets. Means 1007 are provided for HARQ retransmitting the one or more data packets in response to not receiving acknowledgement.

Figure 15:
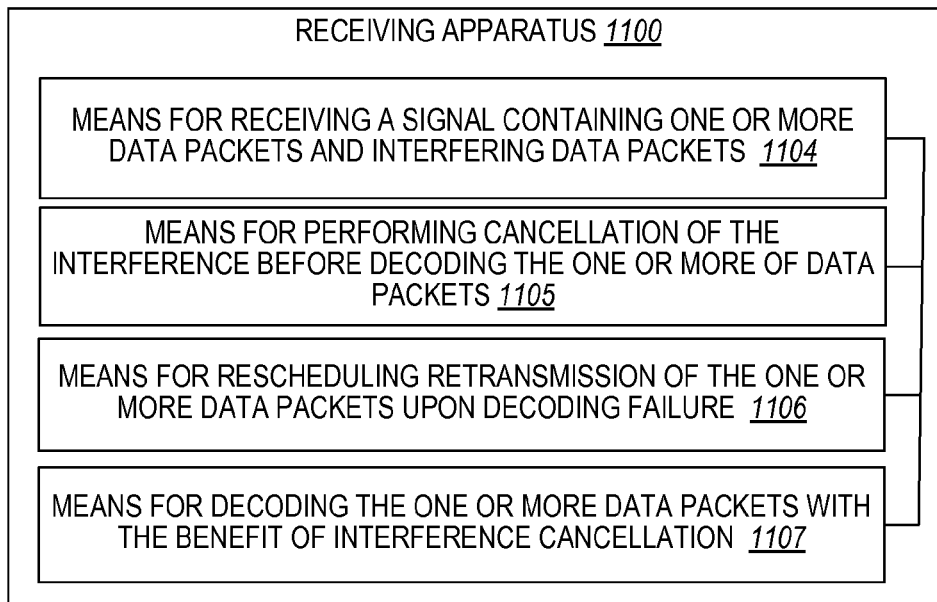
FIG. 15 illustrates an apparatus having means for receiving hybrid automatic repeat request (HARQ) for interference cancellation.

In FIG. 15, a receiving apparatus 1100 provides for receiving hybrid automatic repeat request (HARQ) for interference cancellation. Means 1104 are provided for receiving a signal containing one or more data packets and interfering data packets. Means 1105 are provided for performing cancellation of the interference before decoding the one or more of data packets. Means 1106 are provided for rescheduling retransmission of the one or more data packets upon decoding failure. Means 1107 are provided for decoding the one or more data packets with the benefit of interference cancellation.

While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication comprising:
    determining, at a transmitting node, that a receiving node requires interference cancellation to successfully receive data packets;
    transmitting one or more data packets from the transmitting node to the receiving node after determining that the receiving node requires interference cancellation;
    waiting to receive an acknowledgment corresponding to a result of post-interference cancellation decoding of the transmitted one or more data packets by the receiving node, wherein the acknowledgement comprises at least one of a positive acknowledgement (Ack) or a negative acknowledgement (Nack); and hybrid automatic repeat request (HARQ) retransmitting the one or more data packets in response to receiving a negative acknowledgement of post-interference cancellation.

2. The method of claim 1, further comprising determining that the receiving node requires interference cancellation by receiving an interference report from the receiving node.

3. The method of claim 1, further comprising determining that the receiving node requires interference cancellation by detecting an interfering device.

4. The method of claim 1, further comprising determining that the receiving node requires interference cancellation by instructing the receiving node to perform interference cancellation.

5. The method of claim 1, wherein the HARQ retransmitting includes retransmitting the one or more data packets by performing re-encoding in a different manner and transmitting for incremental redundancy.

6. The method of claim 1, wherein the HARQ retransmitting includes retransmitting the one or more data packets in response to receiving a negative acknowledgement by transmitting a predetermined number of HARQ retransmissions of the one or more data packets deemed sufficient for decoding.

7. The method of claim 6, wherein transmitting the predetermined number of HARQ retransmissions includes selecting the predetermined number based upon a difference between pre-interference cancellation and post-interference cancellation Signal to Interference-plus-Noise Ratio (SINR).

8. The method of claim 1, further comprising:
waiting to receive acknowledgement of post-interference cancellation decoding of the retransmitted one or more of data packets; and
HARQ retransmitting no more than one HARQ retransmission of the one or more of data packets in response to receiving a negative acknowledgement of post-interference cancellation.

9. The method of claim 1, further comprising:
transmitting the one or more data packets in the presence of multiple interference signals each requiring cancellation before decoding the one or more data packets; and
transmitting a retransmission assignment based upon a probability determined at a receiver that decoding of interference will be completed by the retransmission assignment.

10. The method of claim 1, further comprising:
transmitting more than one HARQ retransmission of the one or more data packets,
wherein a value for the more than one HARQ retransmission is selected to provide time for interference cancellation prior to decoding the one or more data packets.

11. The method of claim 10, wherein the HARQ retransmitting includes HARQ retransmitting the one or more data packets in response to receiving a negative acknowledgement by retransmitting a random number of HARQ retransmissions of the one or more data packets.

12. The method of claim 11, further comprising receiving a random number used for retransmitting the random number of HARQ retransmissions.

13. The method of claim 11, further comprising obtaining a local random number for retransmitting the random number of HARQ retransmissions.

14. The method of claim 1, wherein the transmitted and retransmitted one or more data packets are pipelined on a wireless channel with one or more HARQ processes; and further comprising decoding an applicable acknowledgement for a HARQ process from a plurality of acknowledgments distributed across successive timeslots,
wherein the receiving node sorts the HARQ processes that are pipelined by number of retransmissions for ordering successive timeslots.

15. The method of claim 14, further comprising:
receiving a negative acknowledgement (Nack);
and wherein the HARQ retransmitting comprises:
retransmitting a most retransmitted HARQ process in response to not reaching a maximum number of retransmissions; and
retransmitting a most recently initiated HARQ process deemed to have a least chance of having achieved interference cancellation in response to the most retransmitted HARQ process having reached the maximum number of retransmissions.

16. The method of claim 14, further comprising:
waiting for an acknowledgement of most recently initiated HARQ process; and
then waiting for successive acknowledgements of the most retransmitted to the least retransmitted HARQ processes.

17. A computer program product for wireless communication, stored on a non-transitory computer-readable storage medium, comprising code for:
determining, at a transmitting node, that a receiving node requires interference cancellation to successfully receive data packets;
transmitting one or more data packets, from the transmitting node to the receiving node, after determining that the receiving node requires interference cancellation;
waiting to receive an acknowledgment corresponding to a result of post-interference cancellation decoding of the transmitted one or more data packets by the receiving node, wherein the acknowledgement comprises at least one of a positive acknowledgement (ACK) or a negative acknowledgement (NACK); and
hybrid automatic repeat request (HARQ) retransmitting the one or more data packets in response to receiving a negative acknowledgement of post-interference cancellation.

18. An apparatus for wireless communication comprising:
means for determining at a transmitting node that a receiving node requires interference cancellation to successfully receive data packets;
means for transmitting one or more data packets from the transmitting node to the receiving node after determining that the receiving node requires interference cancellation;
means for waiting to receive an acknowledgment corresponding to a result of post-interference cancellation decoding of the transmitted one or more data packets by the receiving node, wherein the acknowledgement comprises at least one of a positive acknowledgement (ACK) or a negative acknowledgement (NACK); and
means for hybrid automatic repeat request (HARQ) retransmitting the one or more data packets in response to receiving a negative acknowledgement of post-interference cancellation.

19. An apparatus for wireless communication comprising:
a computing platform that determines at a transmitting node that a receiving node requires interference cancellation to successfully receive data packets;

a transmitter that transmits one or more data packets from the transmitting node to the receiving node after determining that the receiving node requires interference cancellation;

a receiver that waits to receive an acknowledgment corresponding to a result of post-interference cancellation decoding of the transmitted one or more data packets by the receiving node, wherein the acknowledgement comprises at least one of a positive acknowledgement (ACK) or a negative acknowledgement (NACK); and wherein the transmitter hybrid automatic repeat request (HARQ) retransmits the one or more data packets in response to receiving a negative acknowledgement of post-interference cancellation.

20. The apparatus of claim 19, wherein the computing platform determines that the receiving node requires interference cancellation by receiving an interference report from the a receiving node.

21. The apparatus of claim 19, wherein the computing platform determines that the a receiving node requires interference cancellation by detecting an interfering device.

22. The apparatus of claim 19, wherein the computing platform determines that the a receiving node requires interference cancellation by instructing the receiving node to perform interference cancellation.

23. The apparatus of claim 19, wherein the transmitter HARQ retransmits the one or more data packets by performing re-encoding in a different manner and transmitting for incremental redundancy.

24. The apparatus of claim 19, wherein the transmitter HARQ retransmits the one or more data packets in response to receiving a negative acknowledgement by transmitting a predetermined number of HARQ retransmissions of the one or more data packets deemed sufficient for decoding.

25. The apparatus of claim 24, wherein the transmitter transmits the predetermined number of HARQ retransmissions by selecting the predetermined number based upon a difference between pre-interference cancellation and post-interference cancellation Signal to Interference-plus-Noise Ratio (SINR).

26. The apparatus of claim 19,
wherein the receiver waits to receive acknowledgement of post-interference cancellation decoding of the retransmitted one or more of data packets; and
wherein the transmitter HARQ retransmits no more than one HARQ retransmission of the one or more of data packets in response to receiving a negative acknowledgement of post-interference cancellation.

27. The apparatus of claim 19, wherein the transmitter transmits the one or more data packets in the presence of multiple interference signals each requiring cancellation before decoding the one or more data packets, and transmits a retransmission assignment based upon a probability determined at a receiver that decoding of interference will be completed by the retransmission assignment.

28. The apparatus of claim 19,
wherein the transmitter transmits more than one HARQ retransmission of the one or more data packets, and
wherein a value for more than one is selected to provide time for interference cancellation prior to decoding the one or more data packets.

29. The apparatus of claim 28, wherein the transmitter HARQ retransmits the one or more data packets in response to receiving a negative acknowledgement by retransmitting a random number of HARQ retransmissions of the one or more data packets.

30. The apparatus of claim 29, wherein the receives a random number used for retransmitting the random number of HARQ retransmissions.

31. The apparatus of claim 29, wherein the computing platform obtains a local random number used for retransmitting the random number of HARQ retransmissions.

32. The apparatus of claim 19,
wherein the transmitter transmits and retransmits the one or more data packets that are pipelined on a wireless channel with a HARQ processes; and
wherein the receiver decodes an applicable acknowledgement for a HARQ process from a plurality of acknowledgments distributed across successive timeslots,
wherein the receiving node sorts the HARQ processes that are pipelined by number of retransmissions for ordering successive timeslots.

33. The apparatus of claim 32,
wherein the receiver receives a negative acknowledgement (Nack); and
wherein the transmitter retransmits a most retransmitted HARQ process in response to not reaching a maximum number of retransmissions, and further for retransmitting a most recently initiated HARQ process deemed to have a least chance of having achieved interference cancellation in response to the most retransmitted HARQ process having reached the maximum number of retransmissions.

34. The apparatus of claim 32, wherein the receiver-waits for an acknowledgement of a most recently initiated HARQ process, and then waits for successive acknowledgements of the most retransmitted to the least retransmitted HARQ processes.

35. A method of wireless communication comprising:
receiving a signal containing one or more non-interfering data packets and one or more interfering data packets;
performing interference cancellation before decoding the one or more non-interfering data packets;
rescheduling retransmission of the one or more non-interfering data packets after interference cancellation;
decoding the one or more non-interfering data packets after interference cancellation.

36. The method of claim 35, further comprising:
receiving and decoding the interfering data packets, at a transmitting node that does not suffer from interference by the one or more non-interfering data packets; and
receiving the decoded interfering data packets from the transmitting node, at a receiving node that performs interference cancellation of the one or more interfering data packets from the received signal.

37. The method of claim 35, wherein the rescheduling of the retransmission is performed in response to reporting interference.

38. The method of claim 35, wherein receiving the one or more non-interfering data packets is performed in the presence of multiple interference signals each requiring cancellation before decoding the one or more non-interfering data packets;
and further comprising:
determining and reporting a probability that decoding of interference will be completed by a selected retransmission assignment; and
receiving a retransmission assignment based upon the probability.

39. The method of claim 35,
wherein the one or more non-interfering data packets are pipelined on a wireless channel with one or more HARQ processes;

and further comprising:
   sorting the one or more pipelined hybrid automatic repeat request (HARQ) processes by number of retransmissions for ordering successive timeslots; and
   encoding an applicable acknowledgement for a HARQ process from a plurality of acknowledgments distributed across sorted successive timeslots.

40. The method of claim 39, further comprising:
   transmitting a negative acknowledgement (Nack);
   and wherein receiving the retransmission comprises,
      receiving a retransmission of a most retransmitted HARQ process in response to not reaching a maximum number of retransmissions; and
      receiving a retransmission of a most recently initiated HARQ process deemed to have a least chance of having achieved interference cancellation in response to the most retransmitted HARQ process having reached the maximum number of retransmissions.

41. The method of claim 39, further comprising:
   acknowledging a most recently initiated HARQ process; and
   then acknowledging successively the most retransmitted to the least retransmitted HARQ processes.

42. A computer program product for wireless communication, stored on a non-transitory computer-readable storage medium, comprising code for:
   receiving a signal containing one or more non-interfering data packets and one or more interfering data packets;
   performing interference cancellation before decoding the one or more non-interfering data packets;
   rescheduling retransmission of the one or more non-interfering data packets after interference cancellation;
   decoding the one or more non-interfering data packets after interference cancellation.

43. An apparatus for wireless communication comprising:
   means for receiving a signal containing one or more non-interfering data packets and one or more interfering data packets;
   means for performing interference cancellation before decoding the one or more non-interfering data packets;
   means for rescheduling retransmission of the one or more non-interfering data packets after interference cancellation; and
   means for decoding the one or more non-interfering data packets after interference cancellation.

44. An apparatus for wireless communication comprising:
   a receiver that receives a signal containing one or more non-interfering data packets and one or more interfering data packets;
   a computing platform that performs interference cancellation before decoding the one or more non-interfering data packets, that reschedules retransmission of the one or more non-interfering data packets after interference cancellation, and that encodes the one or more non-interfering data packets after interference cancellation.

45. The apparatus of claim 44, further comprising:
   a first node that receives and decodes the interfering data packets that does not suffer from interference by the one or more non-interfering data packets; and
   a second node that receives the decoded interfering data packets from the first node that performs interference cancellation of interfering data packets from the received signal.

46. The apparatus of claim 44, wherein the computing platform reschedules retransmission of the one or more data packets by reporting interference.

47. The apparatus of claim 44, wherein the receiver receives the one or more non-interfering data packets in the presence of multiple interference signals each requiring cancellation before decoding the one or more non-interfering data packets;
   the computing platform determines a probability that decoding of interference will be completed by a selected retransmission assignment;
   the apparatus further comprises a transmitter that reports the probability; and
   the receiver receives a retransmission assignment based upon the probability.

48. The apparatus of claim 44, wherein:
   the receiver receives transmission and retransmission of the one or more of non-interfering data packets that are pipelined on a wireless channel with one or more hybrid automatic repeat request (HARQ) processes; and
   the computing platform sorts the pipelined HARQ processes by number of retransmissions for ordering successive timeslots, and encodes an applicable acknowledgement for a HARQ process from a plurality of acknowledgments distributed across sorted successive timeslots.

49. The apparatus of claim 48, further comprising a transmitter that transmits a negative acknowledgement (Nack);
   wherein the receiver receives a retransmission of a most retransmitted HARQ process in response to not reaching a maximum number of retransmissions, and receives a retransmission of a most recently initiated HARQ process deemed to have a least chance of having achieved interference cancellation in response to the most retransmitted HARQ process having reached the maximum number of retransmissions.

50. The apparatus of claim 48, further comprising a transmitter that acknowledges a most recently initiated HARQ process, and then acknowledges successively the most retransmitted to the least retransmitted HARQ processes.

* * * * *